United States Patent

Yagi et al.

[15] 3,648,361

[45] Mar. 14, 1972

[54] METHOD OF MANUFACTURING A MAGNETIC HEAD

[72] Inventors: Motoi Yagi, Zushi-shi; Yoshihisa Kawamura, Chigasaki-shi, both of Japan

[73] Assignee: Tokyo Shibaura Electric Co., Ltd., Kawasaki-shi, Japan

[22] Filed: June 23, 1969

[21] Appl. No.: 835,631

[30] Foreign Application Priority Data

June 26, 1968 Japan ....................43/43929
Dec. 5, 1968 Japan ....................43/88614
June 28, 1968 Japan ....................43/54343

[52] U.S. Cl. ....................29/603, 51/326, 179/100.2 C
[51] Int. Cl. ....................G11b 5/42, H01f 7/06
[58] Field of Search ....................29/603; 179/100.2 C; 340/174.1 F; 346/74 MC; 54/326

[56] References Cited

UNITED STATES PATENTS 3,402,463 9/1968 Bos et al. ....................29/603

FOREIGN PATENTS OR APPLICATIONS 1,167,891 12/1962 Germany ....................29/603

*Primary Examiner*—Charlie T. Moon
*Assistant Examiner*—Carl E. Hall
*Attorney*—Flynn & Frishauf

[57] ABSTRACT

A method of making an improved magnetic head used for recording and reproduction in a tape recorder. The magnetic head includes two core halves or pole pieces abutting against each other and between the core halves are formed a hard nonmagnetic spacer and a void space. These core halves are designated in turn as a first core half and a second core half as counted in the travelling direction of the tape. A wedge-shaped lip is formed on the tape-contacting surface of the first core half and extends in the travelling direction of the tape in a manner to cover the void space between the core halves.

7 Claims, 4 Drawing Figures

MOTOI YAGI
YOSHIHISA KAWAMURA
INVENTORS
BY [signature]
Attys

METHOD OF MANUFACTURING A MAGNETIC HEAD

The present invention relates to improvements in a magnetic head and a method for manufacturing the same.

Heretofore, it has been required that for example, at the time of recording of a video signal, the current signal be changed to a magnetic signal without attenuation and thereafter efficiently recorded in a magnetic medium. Also, at the time of reproduction, it is important that the recorded video signal be efficiently changed to a current signal. Further, it is required that a video signal having as wide a frequency band as possible be recorded and reproduced. To meet these conditions, it is necessary to decrease the size of the head gap. However, reduction in size of the head gap will lead to noticeable leakage of a magnetic flux at the head depth with the resultant decrease of sensitivity. Accordingly, the head gap was practically determined by its relationship to the head depth. Compensation was made for the difficulties associated with the gap and depth by accelerating the travelling speed of the magnetic tape. However, the high-speed travel of the tape and the drawback of reducing the recording capacity of the recorder. To eliminate such shortcomings, various attempts were made to improve the head gap. One approach to this end consists in preparing a magnetic head which has core halves with a soft and a hard spacer interposed therebetween. Such magnetic head is defective in that the soft spacer will, after long use of the magnetic head, be deformed and will roughen the tape-contacting surface with a resultant degradation of the linearity of the head gap, thus causing the magnetic head to fail in displaying a stable high performance.

It is an object of the present invention to provide a magnetic head which is improved in the electric-magnetic conversion efficiency, has a long effective life and maintains stable sensitivity and performance even when used with tape moving at very high speeds.

Another object of the invention is to provide a method for manufacturing such an improved magnetic head.

SUMMARY OF THE INVENTION

In accordance with the present invention, a magnetic head having a tape-contacting side is fabricated by preparing first and second core halves, the first and second core halves being designated in turn as counted in the direction of travel of the magnetic tape which is to be passed over the head. A hard nonmagnetic material is deposited on a surface of the second core half which is perpendicular to the tape-contacting side of the resulting magnetic head. A spacer is provided on at least a portion of a surface of the first core half adjacent the tape-contacting side, said surface being perpendicular to the tape-contacting side. The core halves are then arranged adjacent each other with said surfaces in parallel and adjacent to each other. The spacer is then removed, in one embodiment by grinding the tape-contacting side of the head, and in another embodiment by dissolving away the spacer, to expose a void space between said surfaces of the core halves. The tape contacting end is then ground in the same relative direction as the direction of travel of the magnetic tape which is to be passed over the head to form on the first core half a wedge-shaped projection extending over the void space, to thereby form a tape-contacting surface of the magnetic head.

Figure 1:
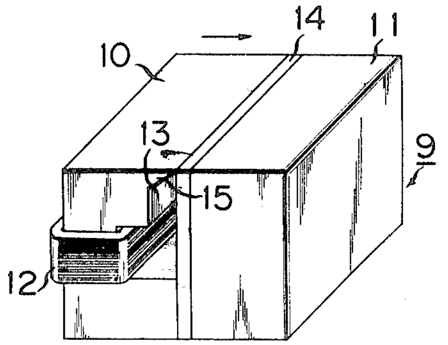
FIG. 1 is a perspective view of a magnetic head according to an embodiment of the invention.
Figure 2:
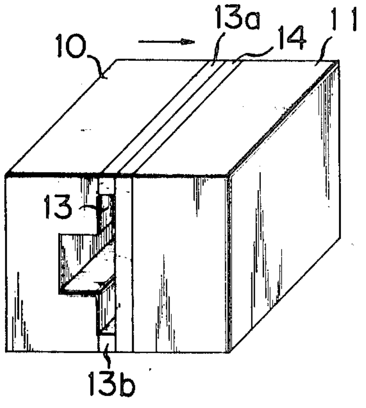
FIG. 2 is a perspective view of the body of a magnetic head during the manufacturing process according to the invention.

There will now be described a magnetic head according to an embodiment of the present invention with reference to the appended drawing. Referring to FIG. 1, a magnetic head 9 comprises core halves or pole pieces 10 and 11 made of a magnetic material of high magnetic permeability such as sendust alloy. The core half 10 is wound with a coil 12, and between the core halves 10 and 11 are interposed, as shown, a void space 13 and a layer 14. It is referred to herein as a "-spacer" for convenience. The layer 14 consists of a thin foil of physically hard nonmagnetic material such as beryllium. The layer 14 is deposited on that plane of the core half 11 facing the core 10. On that side of the core half 10 which faces void space 13 and which is brought into contact with a tape, there is formed a wedge-shaped lip 15 extending in the travelling direction of the magnetic tape so as to cover the void space 13.

As described above, the head gap according to the present invention consist of a void space 13 and hard nonmagnetic material 14 respectively. Since the void area is covered with the wedge-shaped lip 15 extending from the core half 10, there is obtained a magnetic head whose head gap actually consists of a hard nonmagnetic material alone, so that the aforementioned shortcomings are all eliminated. As described above, by virtue of the void space, there is always maintained a linear gap.

Further, the material of the surface of the core half 10 is made slowly to shift its position (this phenomenon is known as surface flow) in the travelling direction of a magnetic tape due to the force of said travel, thus always maintaining a narrow head gap. This enables recording or reproduction to be carried out with good frequency properties. Also, as described above, that part of the core half 10 forming a head gap is provided with the wedge-shaped lip 15, so that magnetic leakage is minimized with the resultant elevation of sensitivity of a magnetic head for recording or reproduction. The magnetic tape moves along, as mentioned above, from the void space 13 to the spacer 14 made of a hard nonmagnetic material, so that though the surface level of the core half 10 is reduced due to the friction caused by the sliding of a magnetic tape over said surface, the surface material of the core half 10 is not entirely worn away but is made to shift position due to the aforesaid phenomenon of surface flow gradually to form the wedge-shaped lip 15. In consequence, the head gap always retains a prescribed form because of the presence of the spacer made of a hard nonmagnetic material. This permits a magnetic head as a whole to have a prolonged useful life.

However, it is generally difficult to manufacture in large quantities a magnetic head having such a void space. As an alternative, therefore, those are prepared precision-worked core halves 10 and 11 which are designated as the first and second in turn as counted in the direction (shown by an arrow) in which a magnetic tape is carried along. On one side of the second core half 11 is vapor deposited a hard nonmagnetic material. One plane of the first core half 10 is made to face the plane of the second core half 11 on which said hard nonmagnetic material is vapor deposited. Between these planes, that is, on that side of the first core half 10 which comes in contact with the magnetic tape, there is perpendicular to the surface which is provided a narrow or slender spacer 13*a* and on the opposite end of said side of said core half 10 is formed another narrow spacer 13*b* spaced from spacer 13*a a*. *These core halves 10 and 11 are fixed in a manner to face each other by being bonded with the spacers 13a* and 13*b*, using an adhesive agent. Thus there is naturally allowed a void space 13 between the spacers 13*a* and 13*b*.

The magnetic head body thus formed is provided with a coil and then ground by a rough grinder until the spacer 13*a* adjacent the tape-contacting side of said head body is removed, so as to expose the aforesaid void space 13. Thereafter the magnetic head is made to rotate at high speed in a condition fitted to a videotape recorder (VTR) of the rotary head type. The tape-contacting plane of the magnetic head body is ground using a grinding tape prepared from very fine abrasive grains to such an extent that there is formed at the upper part of that plane of the core half 10 facing the core half 11 a wedge-shaped projection 15 in a manner fully to cover the void space 13, said formation resulting from the flow of the surface material of said core half 10 caused by the rotation of the head body. The grinding tape is preferably prepared from fine abrasive grains like those of chromium oxide No. 2000 or alumina.

Figure 3:
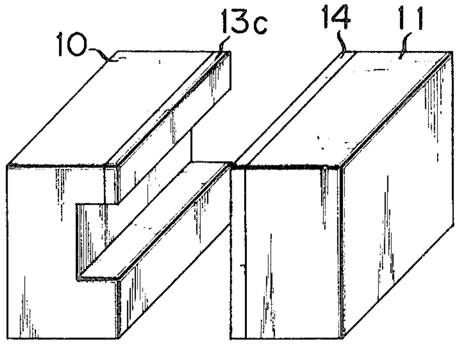
FIG. 3 is a perspective view of a dismembered magnetic head body illustrating another manufacturing method according to the invention.
Figure 4:
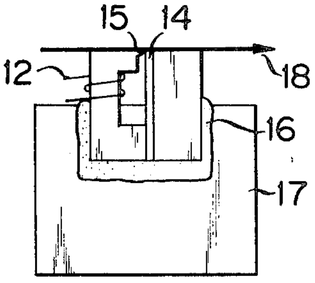
FIG. 4 illustrates the condition in which the magnetic head according to the invention is fitted to a substrate.

Another manufacturing process runs as follows. There are prepared, as shown in FIG. 3, precision worked core halves 10 and 11 which are respectively designated as first and second core halves in turn as counted in the travelling direction (shown by an arrow) of a magnetic tape. On that plane of the first core half 10 which is perpendicular to the surface which comes in contact with the magnetic tape is formed a spacer 13*c* by spraying, coating or vapor depositing soluble organic resin thereon. Thereafter on that plane of the second core half 11 facing the first core half 10 is vapor deposited a hard nonmagnetic material such as silicon monoxide SiO to form a layer 14. The first and second core halves 10 and 11 are joined together by bonding the spacer 13*c* and layer 14 with each other. The magnetic head thus prepared is fixed, as shown in FIG. 4, to a substrate 17 using an adhesive agent 16. The aforesaid spacer 13*c* made of soluble organic resin is dissolved away by being immersed for 10 to 20 minutes in a solvent such as methylene chloride. After the magnetic head body is wound with a coil, an abrasive tape 18 is allowed to travel along, and as in the preceding case, there is formed a wedge-shaped projection 15 at the upper part of that plane of the first core half 10 facing the second core 11 due to the flow of the surface material of said core half 10 caused by the travel of the abrasive tape 18. Thus is manufactured a magnetic head.

We claim:

1. A method of manufacturing a magnetic head having a tape-contacting side which comprises the steps of:

a. preparing first and second precision-worked core halves, said first and second core halves being designated in turn as counted in the travelling direction of magnetic tape which is to be passed thereover;
b. vapor depositing a hard nonmagnetic material on a surface of the second core half which is perpendicular to said tape-contacting side;
c. bringing one plane of the first core half face to face with, and spaced from, that plane of the second core half on which is vapor deposited the hard nonmagnetic material, and providing a first spacer between said planes of the core halves adjacent said tape-contacting side and a second spacer between said planes, said second spacer spaced from said first spacer, thereby creating a void space between the two spacers, and joining together said core halves by bonding them with said spacers in place using an adhesive agent, thereby preparing a magnetic head body;
d. grinding said tape-contacting side of the magnetic head using a rough grinder until the first spacer is fully eliminated to expose said void space; and
e. grinding said tape-contacting side of the magnetic head with fine abrasive grains in the same relative direction as the direction of travel of the magnetic tape which is to be passed over the head to form on the first core half a wedge-shaped projection extending over said void space to thereby form a tape-contacting surface.

2. The method according to claim 1 wherein the grinding step (e) is carried out using a grinding tape by rotating the magnetic head at high speed after fitting it to a rotary head type videorecording tape.

3. A manufacturing method for fabricating a magnetic head having a tape-contacting side which comprises the steps of:

a. preparing first and second precision-worked core halves, said first and second core halves being designated in turn as counted in the travelling direction of magnetic tape which is to be passed thereover;
b. depositing a coating of soluble organic resin on at least a portion of a surface of the first core half, said surface being perpendicular to said tape-contacting side;
c. vapor depositing a hard nonmagnetic material on a surface of the second core half which is perpendicular to said tape-contacting side;
d. bonding together the first and second core halves such that the coated surface of the first core half abuts against the surface of the second core half on which is deposited said hard nonmagnetic material to form a magnetic head;
e. dissolving away said organic resin using a solvent, thereby creating a void space between the first and second core halves;
f. winding a coil around the magnetic head; and
g. forming a wedge-shaped projection covering said void space by grinding the tape-contacting side of said magnetic head in the same relative direction as the direction of travel of the magnetic tape which is to be passed over said magnetic head.

4. The method according to claim 3 wherein said wedge-shaped projection is formed by grinding with a grinding tape.

5. The method according to claim 3, including the step of fixing said core halves which are bonded together to form said magnetic head to a substrate using an adhesive agent prior to the dissolving away of said organic resin.

6. The method according to claim 3, wherein said soluble organic resin is deposited by spraying.

7. The method according to claim 3, wherein said soluble organic resin is vapor deposited.

* * * * *